(12) United States Patent
Sogawa et al.

(10) Patent No.: US 7,391,684 B2
(45) Date of Patent: Jun. 24, 2008

(54) OPTICAL DISK RECORDING/REPRODUCING APPARATUS

(75) Inventors: Teruaki Sogawa, Osaka (JP); Nobuyuki Kimura, Osaka (JP); Takayuki Murakami, Osaka (JP); Katsuichi Inoue, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 712 days.

(21) Appl. No.: 11/053,663

(22) Filed: Feb. 9, 2005

(65) Prior Publication Data

US 2005/0180279 A1    Aug. 18, 2005

(30) Foreign Application Priority Data

Feb. 10, 2004    (JP)    ............................ P2004-032923

(51) Int. Cl.
*G11B 7/00*    (2006.01)
(52) U.S. Cl. ................ 369/44.35; 369/44.36; 369/44.37
(58) Field of Classification Search .............. 369/44.37, 369/44.35, 44.36
See application file for complete search history.

(56) References Cited

U.S. PATENT DOCUMENTS

| | | | | |
|---|---|---|---|---|
| 6,154,425 A | * | 11/2000 | Iida et al. ................ | 369/44.29 |
| 6,246,660 B1 | * | 6/2001 | Yanagawa ................... | 369/116 |
| 6,388,963 B1 | * | 5/2002 | Tanaka ..................... | 369/44.26 |
| 2002/0131348 A1 | * | 9/2002 | Furuhata et al. .......... | 369/44.37 |
| 2004/0151084 A1 | * | 8/2004 | Ishikawa ................. | 369/30.14 |

FOREIGN PATENT DOCUMENTS

| JP | A-2001-307352 | 11/2001 |
|---|---|---|
| JP | A-2002-183992 | 6/2002 |
| JP | A-2003-006893 | 1/2003 |
| JP | A-2003-317274 | 11/2003 |

* cited by examiner

*Primary Examiner*—Wayne Young
*Assistant Examiner*—Linh T Nguyen
(74) *Attorney, Agent, or Firm*—Morgan, Lewis & Bockius LLP

(57) ABSTRACT

In a processing section 4, allowable gain-value range defining unit 41 measures a gain value k corresponding to a level ratio between an MPP signal and an SPP signal generated by a tracking error signal generating circuit 3 to define an allowable range of the gain value, and eccentricity measuring unit 42 measures an eccentricity of an optical disk. If the eccentricity is determined to be greater than or equal to a predetermined value by eccentricity determining unit 43, gain-value defining unit 44 selects a minimum value of the gain value k to define the minimum value as a gain value k of an amplifier 37. On the other hand, if the eccentricity is determined to be less than the predetermined value, the gain-value defining unit 44 selects a central value of the gain value k to define the central value as the gain value k of the amplifier 37.

8 Claims, 10 Drawing Sheets

US 7,391,684 B2

OPTICAL DISK RECORDING/REPRODUCING APPARATUS

BACKGROUND OF THE INVENTION

1. Field of the Invention

The present invention relates to an optical disk recording/reproducing apparatus for recording information on an optical disk and for reproducing information recorded on the optical disk, and more particularly, to an enhancement of a tracking servo of an optical pickup.

2. Description of the Related Art

In general, optical disk recording/reproducing apparatuses employ tracking servo schemes, that is, a control scheme for enabling a laser beam emitted from an optical pickup to accurately follow a track formed on an optical disk. A differential push-pull (DPP) scheme is one of the tracking servo schemes. In the DPP scheme, a tracking error signal is generated by calculating signals output from respective light-receiving elements for receiving one main beam and two sub beams.

Specifically, in the DPP scheme, refracting means is provided at a position in a path of the laser beam emitted from a laser source of the optical pickup, three spots are formed on the optical disk by three light beams of one zero-th order refracted light beam (main beam) and two first order refracted light beams (sub beams), and lights reflected therefrom are received by photo-detectors. The main spot formed by the main beam is used to record or read out a signal, and the sub spots formed by the sub beams are used to detect the tracking error signal.

A main photo-detector for receiving a main beam reflected from the main spot is horizontally and vertically partitioned into four elements. Each of sub photo-detectors for receiving two sub spots is horizontally partitioned into two elements. Output signals of the four partitioned elements of the main photo-detector are indicated by A, B, C, and D, respectively. Output signals of two partitioned elements of one of the sub photo-detectors are indicated by E and F, respectively, and output signals of two partitioned elements of the other of the sub photo-detectors are indicated by G and H (see FIG. 2).

A main push-pull signal (MPP signal) can be obtained from the output signals A, B, C, and D of the main photo-detector by using the following expression (1).

$$MPP=(A+D)-(B+C) \quad (1)$$

One sub push-pull signal (SPP1 signal) can be obtained from the output signals E and F of the one sub photo-detector by using the following expression (2), and the other sub push-pull signal (SPP2 signal) can be obtained from the output signals G and H of the other sub photo-detector by using the following expression (3).

$$SPP1=F-E \quad (2)$$

$$SPP2=H-G \quad (3)$$

As a result, a sub push-pull signal (SPP signal) can be represented by the following expression (4).

$$SPP=SPP1+SPP2=(F+H)-(E+G) \quad (4)$$

Accordingly, a DPP tracking error signal (DPP•TE signal) can be obtained by using the following expression (5).

$$DPPTE=[(A+D)-(B+C)]-k*[(F+H)-(E+G)] \quad (5)$$

Here, k is a coefficient used to correct the level ratio between the main push-pull signal (MPP signal) and the sub push-pull signal (SPP signal). The coefficient k corresponds to the gain value of an amplifier for amplifying the sub push-pull signal (SPP signal).

Conventional optical disk recording/reproducing apparatuses are disclosed in JP-A-2003-317274, JP-A-2001-307352, JP-A-2002-183992, and in JP-A-2003-006893.

SUMMARY OF THE INVENTION

However, in a conventional optical disk recording/reproducing apparatus employing such a DPP-scheme tracking servo, the deterioration in the amplitude of the DPP tracking error signal (DPP•TE signal) occurs for a half of rotational period of the optical disk due to a mechanically center-shifted (hereinafter, referred to as RD-shifted) optical disk or an eccentric optical disk (see FIG. 11A). Here, the deterioration in the amplitude is generated by change of a distance between the track and the sub beams on the optical disk and is represented as the phase difference between the sub beams in the radial direction of the optical disk. In a case where the phase difference occurs between the sub beams, since the amplitude difference occurs in the sub push-pull signal (SPP signal) generating the DPP tracking error signal (DPP•TE signal) (see FIG. 11C), the amplitude difference affects the DPP tracking error signal (DPP•TE signal), so that the DPP tracking error signal (DPP•TE signal) deteriorates (see FIG. 11A).

Similarly, in the conventional optical disk recording/reproducing apparatus, in case of the RD-shifted or eccentric disk, the phase difference occurs between the sub beams, so that the amplitude difference occurs in the sub push-pull signal (SPP signal) generating the DPP tracking error signal (DPP•TE signal). In turn, the amplitude difference affects the DPP tracking error signal (DPP•TE signal), so that the DPP tracking error signal (DPP•TE signal) deteriorates. As a result, there are problems in that the quality of the DPP tracking error signal (DPP•TE signal) further deteriorates, the accuracy of the tracking servo is lowered.

In addition, in a conventional technique disclosed in JP-A-2003-317274, a level difference between the MPP and SPP signals generated by change of an amount of a beam reflected from an optical disk is measured by using reflected-beam measuring means in advance, a suitable SPP gain value obtained based on the level difference by using SPP gain-value calculating means is stored in storage means, and the suitable SPP gain value is set for SPP gain-value adjusting means according to the change of the amount of the reflected beam occurring during the subsequent operation. However, there is not provided a countermeasure to prevent the problem in that the phase difference between the sub beams due to the RD-shifted or eccentric disk causes the amplitude difference in the sub push-pull signal (SPP signal), and thus, the measurement for prevention of the deterioration of the tracking error signal has not been considered. Therefore, the problem still remains to be solved.

In addition, in a conventional technique disclosed in JP-A-2001-307352, in a case where there is a variation in optical parts or a positional misalignment of object lenses or photo-detectors, the offset of SPP signals can be cancelled during a recording operation. However, there is not provided a countermeasure to prevent the problem in that the phase difference between the sub beams due to the RD-shifted or eccentric disk causes the amplitude difference in the sub push-pull signal (SPP signal), and thus, the measurement for prevention of the deterioration of the tracking error signal has not been considered. Therefore, the problem still remains to be solved.

In addition, in a conventional technique disclosed in JP-A-2002-183992, even in a case there is an error of an interval between main and sub beam spots during a tracking servo operation performed by using a differential push-pull scheme, the direct-current offsets due to an optical-axis misalignment can be lowered. However, there is not provided a countermeasure to prevent the problem in that the phase difference between the sub beams due to the RD-shifted or eccentric disk causes the amplitude difference in the sub push-pull signal (SPP signal), and thus, the measurement for prevention of the deterioration of the tracking error signal has not been considered. Therefore, the problem still remains to be solved.

In addition, in a conventional technique disclosed in JP-A-2003-006893, an amplification ratio of amplifiers for amplifying respective optical signals obtained by light-receiving elements in the left and right peripheral sections of an optical instrument is adjusted to cancel the offset between outputs of the amplifiers. However, there is not provided a countermeasure to prevent the problem in that the phase difference between the sub beams due to the RD-shifted or eccentric disk causes the amplitude difference in the sub push-pull signal (SPP signal), and thus, the measurement for prevention of the deterioration of the tracking error signal has not been considered. Therefore, the problem still remains to be solved.

One of objects of the present invention is to provide an optical disk recording/reproducing apparatus capable of improving the accuracy of a tracking servo by markedly suppressing the deterioration in quality of a tracking error signal due to an RD-shifted or eccentric disk.

According to a first aspect of the invention, there is provided an optical disk recording/reproducing apparatus including: (1) an optical pickup that emits a laser beam containing main and sub beams onto an optical disk, the optical pickup including: main beam receiving means for receiving the main beam reflected from a target track of the optical disk; and sub beam receiving means for receiving the sub beam reflected from a position deviated from the target track; (2) a tracking error signal calculating circuit including: main push-pull signal generating means for generating a main push-pull signal which is a main servo error signal based on the main beam signal output from the main beam receiving means; sub push-pull signal generating means for generating a sub push-pull signal which is a sub servo error signal based on the sub beam signal output from the sub beam receiving means; amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including: allowable gain-value range defining means for measuring the gain value corresponding to a level ratio between the main push-pull signal and the sub push-pull signal to define an allowable range of the gain value; eccentricity measuring means for measuring an eccentricity of the optical disk based on the sub push-pull signal; eccentricity determining means for determining whether or not the measured eccentricity is greater than or equal to a predetermined value; and gain-value defining means for defining a minimum value as a gain value of the amplifying means by selecting the minimum value of the gain value if the eccentricity is determined to be greater than or equal to the predetermined value and for defining a central value as a gain value of the amplifying means by selecting the central value of the gain value if the eccentricity is determined to be less than the predetermined value.

According to a second aspect of the invention, there is provided an optical disk recording/reproducing apparatus including: (1) an optical pickup that emits a laser beam containing main and sub beams onto an optical disk, the optical pickup including: main beam receiving means for receiving the main beam reflected from a target track of the optical disk; and sub beam receiving means for receiving the sub beam reflected from a position deviated from the target track; (2) a tracking error signal calculating circuit including: main push-pull signal generating means for generating a main push-pull signal which is a main servo error signal based on the main beam signal output from the main beam receiving means; sub push-pull signal generating means for generating a sub push-pull signal which is a sub servo error signal based on the sub beam signal output from the sub beam receiving means; amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including: maximum gain-value defining means for measuring the gain value corresponding to a level ratio between the main push-pull signal and the sub push-pull signal to define an maximum value of the gain value; eccentricity measuring means for measuring an eccentricity of the optical disk based on the sub push-pull signal; eccentricity determining means for determining whether or not the measured eccentricity is greater than or equal to a predetermined value; maximum gain-value re-measuring means for defining one of preceding and following beam signals of the reflected sub beam as the sub push-pull signal and for re-measuring the maximum value of the gain value to define the maximum value as the gain value of the amplifying means if the eccentricity is determined to be greater than or equal to the predetermined value; and gain-value defining means for selecting the maximum value of the gain value to define the maximum value as the gain value of the amplifying means if the eccentricity is determined to be less than the predetermined value.

According to a third aspect of the invention, there is provided an optical disk recording/reproducing apparatus including: (1) an optical pickup that emits a laser beam containing main and sub beams onto an optical disk, the optical pickup including: main beam receiving means for receiving the main beam reflected from a target track of the optical disk; and sub beam receiving means for receiving the sub beam reflected from a position deviated from the target track; (2) a tracking error signal calculating circuit including: main push-pull signal generating means for generating a main push-pull signal which is a main servo error signal based on the main beam signal output from the main beam receiving means; sub push-pull signal generating means for generating a sub push-pull signal which is a sub servo error signal based on the sub beam signal output from the sub beam receiving means; amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including: allowable gain-value range defining means for measuring the gain value corresponding to a level ratio between the main push-pull signal and the sub push-pull signal to define an allowable range of the gain value; sub push-pull signal amplitude measuring means for measuring an amplitude of the sub push-pull signal; amplitude-variation determining means for determining whether or not a variation in the measured amplitude is greater than or equal to a predetermined value; and gain-value defining means for selecting a minimum value of the gain value to define the minimum value as a gain value of the amplifying means if the variation in the measured amplitude is determined to be greater than or equal to the predetermined value and for selecting a central value of the gain value to define the central value as the gain value of the amplifying means if the variation in the measured amplitude is determined to be less than the predetermined value.

According to a fourth aspect of the invention, there is provided an optical disk recording/reproducing apparatus including: (1) an optical pickup that emits a laser beam containing main and sub beams onto an optical disk, the optical pickup including: main beam receiving means for receiving the main beam reflected from a target track of the optical disk; and sub beam receiving means for receiving the sub beam reflected from a position deviated from the target track; (2) a tracking error signal calculating circuit including: main push-pull signal generating means for generating a main push-pull signal which is a main servo error signal based on the main beam signal output from the main beam receiving means; sub push-pull signal generating means for generating a sub push-pull signal which is a sub servo error signal based on the sub beam signal output from the sub beam receiving means; amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including: maximum gain-value defining means for measuring the gain value corresponding to a level ratio between the main push-pull signal and the sub push-pull signal to define an maximum value of the gain value; sub push-pull signal amplitude measuring means for measuring an amplitude of the sub push-pull signal; amplitude-variation determining means for determining whether or not a variation in the measured amplitude is greater than or equal to a predetermined value; maximum gain-value re-measuring means for defining one of preceding and following beam signals of the reflected sub beam as the sub push-pull signal and for re-measuring the maximum value of the gain value to define the maximum value as the gain value of the amplifying means if the variation in the amplitude is determined to be greater than or equal to the predetermined value; and gain-value defining means for selecting the maximum value of the gain value to define the maximum value as the gain value of the amplifying means if the variation in the amplitude is determined to be less than the predetermined value.

According to a fifth aspect of the invention, there is provided an optical disk recording/reproducing apparatus including: (1) an optical pickup that emits a laser beam containing main and sub beams onto an optical disk, the optical pickup including: a main beam receiving unit that receives the main beam reflected from a target track of the optical disk; and a sub beam receiving unit that receives the sub beam reflected from a position deviated from the target track; (2) a tracking error signal calculating circuit including: a main push-pull signal generating unit that generates a main push-pull signal which is a main servo error signal based on the main beam signal output from the main beam receiving unit; a sub push-pull signal generating unit that generates a sub push-pull signal which is a sub servo error signal based on the sub beam signal output from the sub beam receiving unit; an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including: an allowable gain-value range defining unit that measures the gain value corresponding to a level ratio between the main push-pull signal and the sub push-pull signal to define an allowable range of the gain value; an eccentricity measuring unit that measures an eccentricity of the optical disk based on the sub push-pull signal; an eccentricity determining unit that determines whether or not the measured eccentricity is greater than or equal to a predetermined value; and a gain-value defining unit that defines a minimum value as a gain value of the amplifying unit by selecting the minimum value of the gain value if the eccentricity is determined to be greater than or equal to the predetermined value and that defines a central value as a gain value of the amplifying unit by selecting the central value of the gain value if the eccentricity is determined to be less than the predetermined value.

According to a sixth aspect of the invention, there is provided an optical disk recording/reproducing apparatus including: (1) an optical pickup that emits a laser beam containing main and sub beams onto an optical disk, the optical pickup including: a main beam receiving unit that receives the main beam reflected from a target track of the optical disk; and a sub beam receiving unit that receives the sub beam reflected from a position deviated from the target track; (2) a tracking error signal calculating circuit including: a main push-pull signal generating unit that generates a main push-pull signal which is a main servo error signal based on the main beam signal output from the main beam receiving unit; a sub push-pull signal generating unit that generates a sub push-pull signal which is a sub servo error signal based on the sub beam signal output from the sub beam receiving unit; an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including: a maximum gain-value defining unit that measures the gain value corresponding to a level ratio between the main push-pull signal and the sub push-pull signal to define an maximum value of the gain value; an eccentricity measuring unit that measures an eccentricity of the optical disk based on the sub push-pull signal; an eccentricity determining unit that determines whether or not the measured eccentricity is greater than or equal to a predetermined value; a maximum gain-value re-measuring unit that defines one of preceding and following beam signals of the reflected sub beam as the sub push-pull signal and re-measures the maximum value of the gain value to define the maximum value as the gain value of the amplifying unit if the eccentricity is determined to be greater than or equal to the predetermined value; and a gain-value defining unit that selects the maximum value of the gain value to define the maximum value as the gain value of the amplifying unit if the eccentricity is determined to be less than the predetermined value.

According to a seventh aspect of the invention, there is provided an optical disk recording/reproducing apparatus including: (1) an optical pickup that emits a laser beam containing main and sub beams onto an optical disk, the optical pickup including: a main beam receiving unit that receives the main beam reflected from a target track of the optical disk; and a sub beam receiving unit that receives the sub beam reflected from a position deviated from the target track; (2) a tracking error signal calculating circuit including: a main push-pull signal generating unit that generates a main push-pull signal which is a main servo error signal based on the main beam signal output from the main beam receiving unit; a sub push-pull signal generating unit that generates a sub push-pull signal which is a sub servo error signal based on the sub beam signal output from the sub beam receiving unit; an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including: an allowable gain-value range defining unit that measures the gain value corresponding to a level ratio between the main push-pull signal and the sub push-pull signal to define an allowable range of the gain value; a sub push-pull signal amplitude measuring unit that measures an amplitude of the sub push-pull signal; an amplitude-variation determining unit that determines whether or not a variation in the measured amplitude is greater than or equal to a predetermined value; and a gain-value defining unit that selects a minimum value of the gain value to define the minimum value as a gain value of the amplifying unit if the variation in the measured amplitude is determined to be greater than or equal to the predetermined value and that selects a central value of the gain value to define the central value as the gain value of the amplifying unit if the variation in the measured amplitude is determined to be less than the predetermined value.

According to an eighth aspect of the invention, there is provided an optical disk recording/reproducing apparatus including: (1) an optical pickup that emits a laser beam containing main and sub beams onto an optical disk, the optical pickup including: a main beam receiving unit that receives the main beam reflected from a target track of the optical disk; and a sub beam receiving unit that receives the sub beam reflected from a position deviated from the target track; (2) a tracking error signal calculating circuit including: a main push-pull signal generating unit that generates a main push-pull signal which is a main servo error signal based on the main beam signal output from the main beam receiving unit; a sub push-pull signal generating unit that generates a sub push-pull signal which is a sub servo error signal based on the sub beam signal output from the sub beam receiving unit; an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including: a maximum gain-value defining unit that measures the gain value corresponding to a level ratio between the main push-pull signal and the sub push-pull signal to define an maximum value of the gain value; a sub push-pull signal amplitude measuring unit that measures an amplitude of the sub push-pull signal; an amplitude-variation determining unit that determines whether or not a variation in the measured amplitude is greater than or equal to a predetermined value; a maximum gain-value re-measuring unit that defines one of preceding and following beam signals of the reflected sub beam as the sub push-pull signal and re-measures the maximum value of the gain value to define the maximum value as the gain value of the amplifying unit if the variation in the amplitude is determined to be greater than or equal to the predetermined value; and a gain-value defining unit that selects the maximum value of the gain value to define the maximum value as the gain value of the amplifying unit if the variation in the amplitude is determined to be less than the predetermined value.

BRIEF DESCRIPTION OF THE DRAWINGS

The above objects and advantages of the present invention will become more apparent by describing preferred exemplary embodiments thereof in detail with reference to the accompanying drawings, wherein:

FIGS. 11A-11D are signal waveform views schematically showing signal waveforms obtained by measuring a DPP tracking error signal, and so on.

DETAILED DESCRIPTION OF THE PREFERRED EMBODIMENTS

Figure 1:
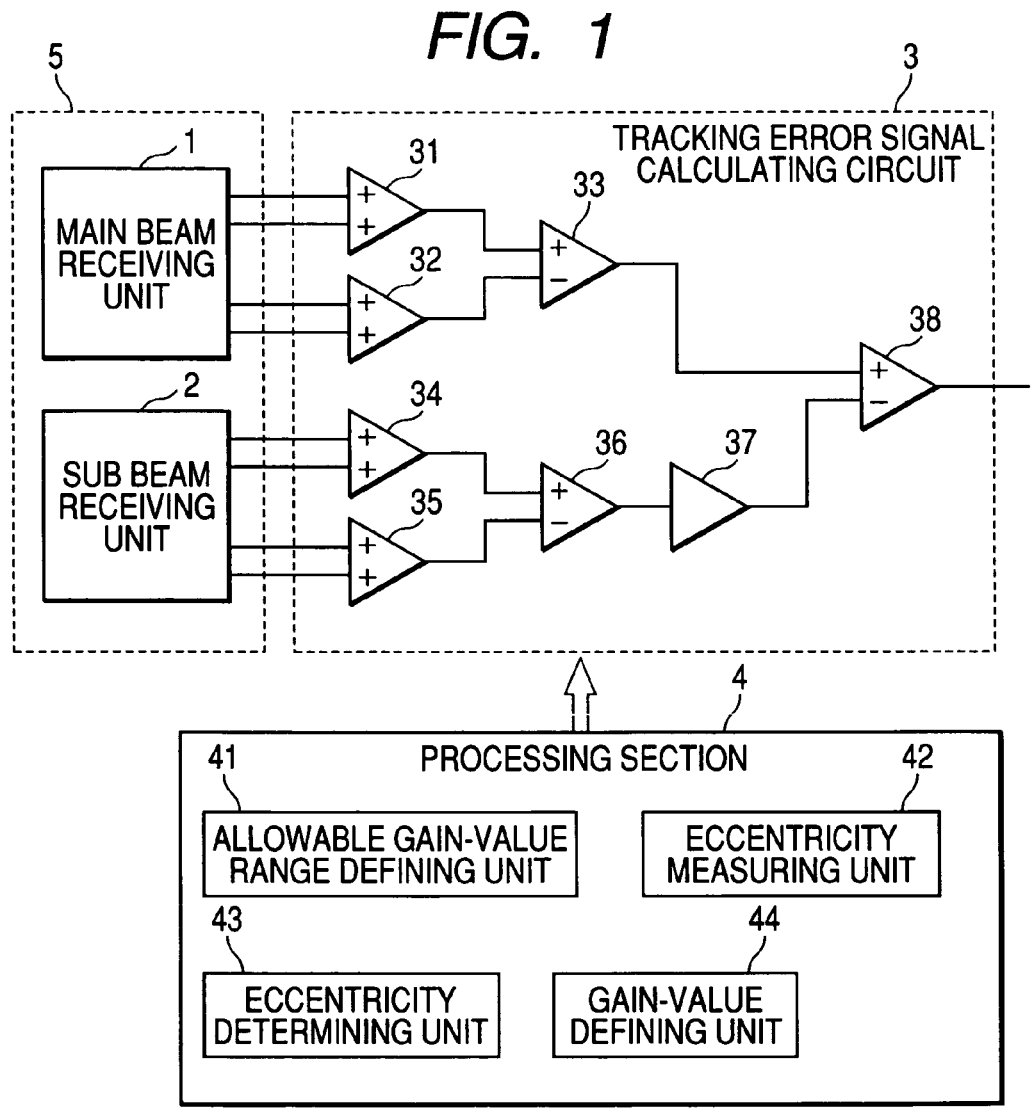
FIG. 1 is a block diagram showing configurations of a tracking error signal calculating circuit and a processing section in an optical disk recording/reproducing apparatus according to a first embodiment of the present invention.

Now, embodiments of the present invention will be described with reference to the accompanying drawings. FIG. 1 is a block diagram showing configurations of a tracking error signal calculating circuit and a processing section in an optical disk recording/reproducing apparatus according to a first embodiment of the present invention.

The optical disk recording/reproducing apparatus includes an optical pickup 5, a tracking error signal calculating circuit 3, and a processing section 4. The optical pickup 5 emits a laser beam containing main and sub beams on an optical disk and includes a main beam receiving unit 1 for receiving a main beam reflected from a target track of the optical disk and a sub beam receiving unit 2 for receiving a sub beam reflected from a position deviated from the target track.

Figure 2:
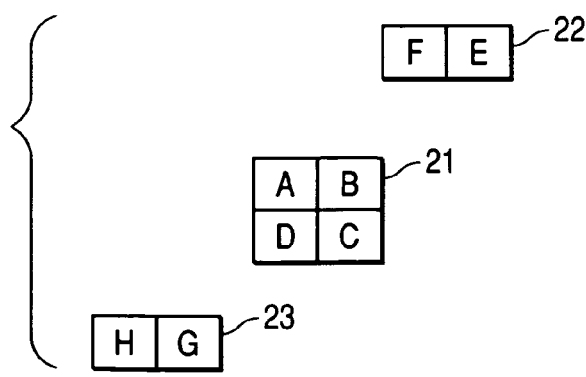
FIG. 2 is a view showing light-receiving regions of main and sub photo-detectors.

The main beam receiving unit 1 includes four partitioned main photo-detectors 21 (see FIG. 2) for receiving the reflected main beam reflected from the target track of the optical disk, and the main photo-detectors 21 outputs signals A, B, C, and D. In addition, the sub beam receiving unit 2 includes two partitioned preceding sub photo-detectors 22 (see FIG. 2) for receiving preceding reflected beams of the sub beams reflected from a position deviated from the target track of the optical disk and two partitioned following sub photo-detectors 23 (see FIG. 2) for receiving following reflected beams of the sub beams reflected from a position deviated from the target track of the optical disk. The preceding sub photo-detectors 22 output signals E and F, and the following sub photo-detectors 23 output signals G and H.

The tracking error signal calculating circuit 3 includes main push-pull signal generating unit for generating a main push-pull signal (MPP signal), that is, a main servo error signal, based on the main beam signals output from the main beam receiving unit 1, sub push-pull signal generating unit for generating a sub push-pull signal (SPP signal), that is, a sub servo error signal, based on the sub beam signals output from the sub beam receiving unit 2, amplifying unit for amplifying the sub push-pull signal (SPP signal) output from the sub push-pull signal generating unit based on a gain value k, and tracking error signal generating unit for generating a differential-push-pull-scheme tracking error signal (DPP•TE signal) based on the main push-pull signal (MPP signal) output from the main push-pull signal generating unit and the sub push-pull signal (SPP signal) output from the amplifying unit.

The main push-pull signal generating unit includes an adder 31, an adder 32, and a subtractor 33. The adder 31 obtains a sum of signals A and D output from the main beam receiving unit 1 and outputs a signal (A+D). The adder 32 obtains a sum of signals B and C output from the main beam receiving unit 1 and outputs a signal (B+C). The subtractor 33 obtains a difference between the signal (A+D) output from the adder 31 and the signal (B+C) output from the adder 32 and outputs a signal [(A+D)−(B+C)]. The signal [(A+D)−(B+C)] is the main push-pull signal (MPP signal).

The sub push-pull signal generating unit includes an adder 34, an adder 35, and a subtractor 36. The adder 34 obtains a sum of signals E and H output from the sub beam receiving unit 2 and outputs a signal (E+H). The adder 35 obtains a sum of signals F and G output from the sub beam receiving unit 2 and outputs a signal (F+G). The subtractor 36 obtains a difference between the signal (E+H) output from the adder 34 and the signal (F+G) output from the adder 35 and outputs a signal [(E+H)−(F+G)]. The signal [(E+H)−(F+G)] is the sub push-pull signal (SPP signal).

An amplifier 37, which is the amplifying unit, amplifying the sub push-pull signal [(E+H)−(F+G)] output from the subtractor 36 with the gain value k and outputs a sub push-pull signal k*[(E+H)−(F+G)]. A subtractor 38, which is the tracking error signal generating unit, obtains a difference between the main push-pull signal [(A+D)−(B+C)] output from the subtractor 33 and the sub push-pull signal k*[(E+H)−(F+G)] output from the amplifier 37 and output a signal [(A+D)−(B+C)]−k*[(E+H)−(F+G)]. The signal [(A+D)−(B+C)]−k*[(E+H)−(F+G)] is the differential-push-pull-scheme tracking error signal (DPP•TE signal).

In addition, in a case where the DPP•TE signal contains only the MPP signal, when there is a shift of the lens of the optical pick or a tilt of the disk, an offset occurs in the DPP•TE signal, so that an accurate tracking servo cannot be obtained. Therefore, in order to cancel the offset, the optical pickup 5 generates an SPP signal from two sub beams by using three beams including two main beams and a sub beam and cancels the offset from the MPP−k*SPP.

The processing section 4 includes allowable gain-value range defining unit 41 for measuring the gain value k (corresponding to the gain value k of the amplifier 37) corresponding to a level ratio between the main push-pull signal (MPP signal) and the sub push-pull signal (SPP signal) to define an allowable range of the gain value k, eccentricity measuring unit 42 for measuring an eccentricity of the optical disk based on the sub push-pull signal (SPP signal), eccentricity determining unit 43 for determining whether or not the measured eccentricity is greater than or equal to a predetermined value, and gain-value defining unit 44 for selecting a minimum value of the gain value k to define the minimum value as a gain value k of the amplifier 37 if the eccentricity is determined to be greater than or equal to the predetermined value and selecting a central value of the gain value k to define the central value as the gain value k of the amplifier 37 if the eccentricity is determined to be less than the predetermined value.

Figure 3:
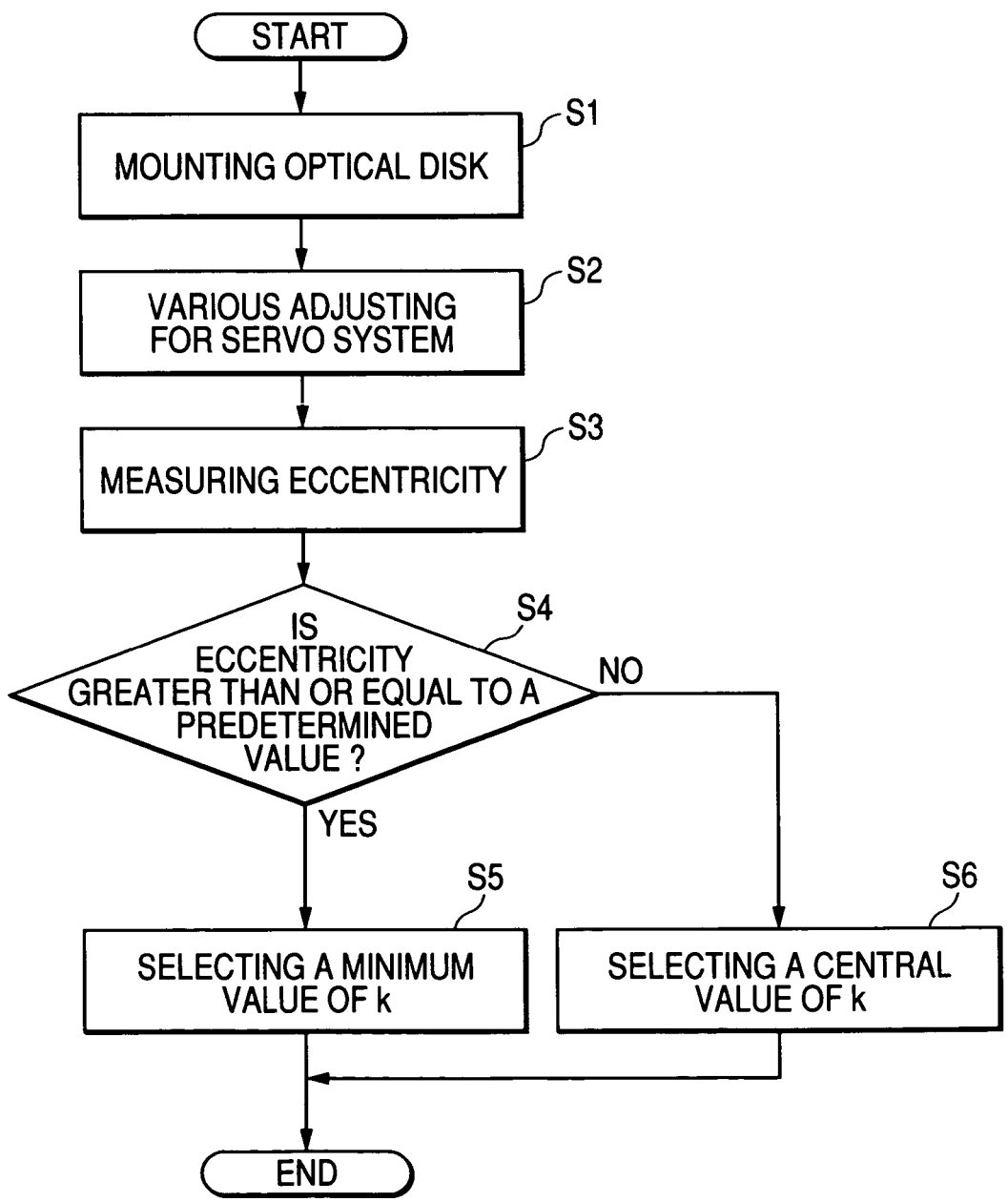
FIG. 3 is a flowchart for explaining a process for correcting a gain value in the first embodiment.

FIG. 3 is a flowchart for explaining a process for correcting a gain value k in the first embodiment. The process for correcting the gain value k will be described with reference to the flowchart.

In the process, in consideration of the eccentricity of the optical disk, the gain value k corresponding to the level ratio between the MPP and SPP signals, which are used to generate the DPP•TE signal, is corrected. If the gain value k is lowered as shown in the expression (1) representing the generation of the DPP•TE signal, a variation in amplitude of the SPP signal exerts a small affect on the DPP•TE signal, but the offset due to the tilt of the disk may be not sufficiently cancelled. Therefore, an allowable value of the gain value k involved in the tilt of the disk or the shift of the lens is selected in advance. For example, assuming that a maximum value is k=3.5 and an allowable range is k=3.0~4.0 in a servo system, if the eccentricity is greater than or equal to a predetermined value (for example, 100 μm), k=3.0 is selected.

By selecting the gain value k in such a manner, the deterioration in quality of the DPP•TE signal can be suppressed and lowered without damage to the servo performance, so that the tracking servo performance can be improved. In other words, the tracking servo performance can be improved by suppressing the ratio of deterioration in the amplitude of the DPP•TE signal to the variation in the amplitude of the SPP signal and lowering the affect on the servo system (characteristics of the shift of the lens).

Firstly, the optical disk is mounted on the optical disk recording/reproducing apparatus (Step S1), and while the optical disk rotates, various adjustments such as tracking servo and focusing servo are performed on the servo system (Step S2). In the Step S2, the allowable gain-value range defining unit 41 of the processing section 4 measures the gain value k corresponding to a level ratio between the main push-pull signal (MPP signal) and the sub push-pull signal (SPP signal), which are generated by the tracking error signal calculating circuit 3, to define an allowable range of the gain value k. In other words, the allowable range of the gain value k is checked, and a range of the gain value k which does not affect the servo characteristic is measured.

Next, the eccentricity measuring unit 42 measures the eccentricity of the optical disk based on the sub push-pull signal (SPP signal) (Step S3) Here, the eccentricity for one rotation of the optical disk is measured. If the eccentricity is determined to be greater than or equal to the predetermined value by the eccentricity determining unit 43 (Step S4), the gain-value defining unit 44 selects a minimum value of the gain value k (Step S5) to define the minimum value as a gain value k of the amplifier 37. On the other hand, if the eccentricity is determined to be less than the predetermined value (Step S4), the gain-value defining unit 44 selects a central value of the gain value k (Step S6) to define the central value as a gain value k of the amplifier 37.

According to the first embodiment, since the gain value k corresponding to the level ratio between the main push-pull signal (MPP signal) and the sub push-pull signal (SPP signal), which are used to generate the DPP tracking error signal (DPP•TE signal) can be corrected based on the eccentricity of the optical disk, accuracy of the tracking servo can be improved by greatly suppressing the deterioration in quality of the DPP tracking error signal (DPP•TE signal) due to the RD-shifted or eccentric disk. Therefore, the tracking servo during the recording or reproducing operation is stabilized, so that the recording or reproducing operation can be stabilized. In particular, a high recording density for the recording operation can be obtained.

Figure 4:
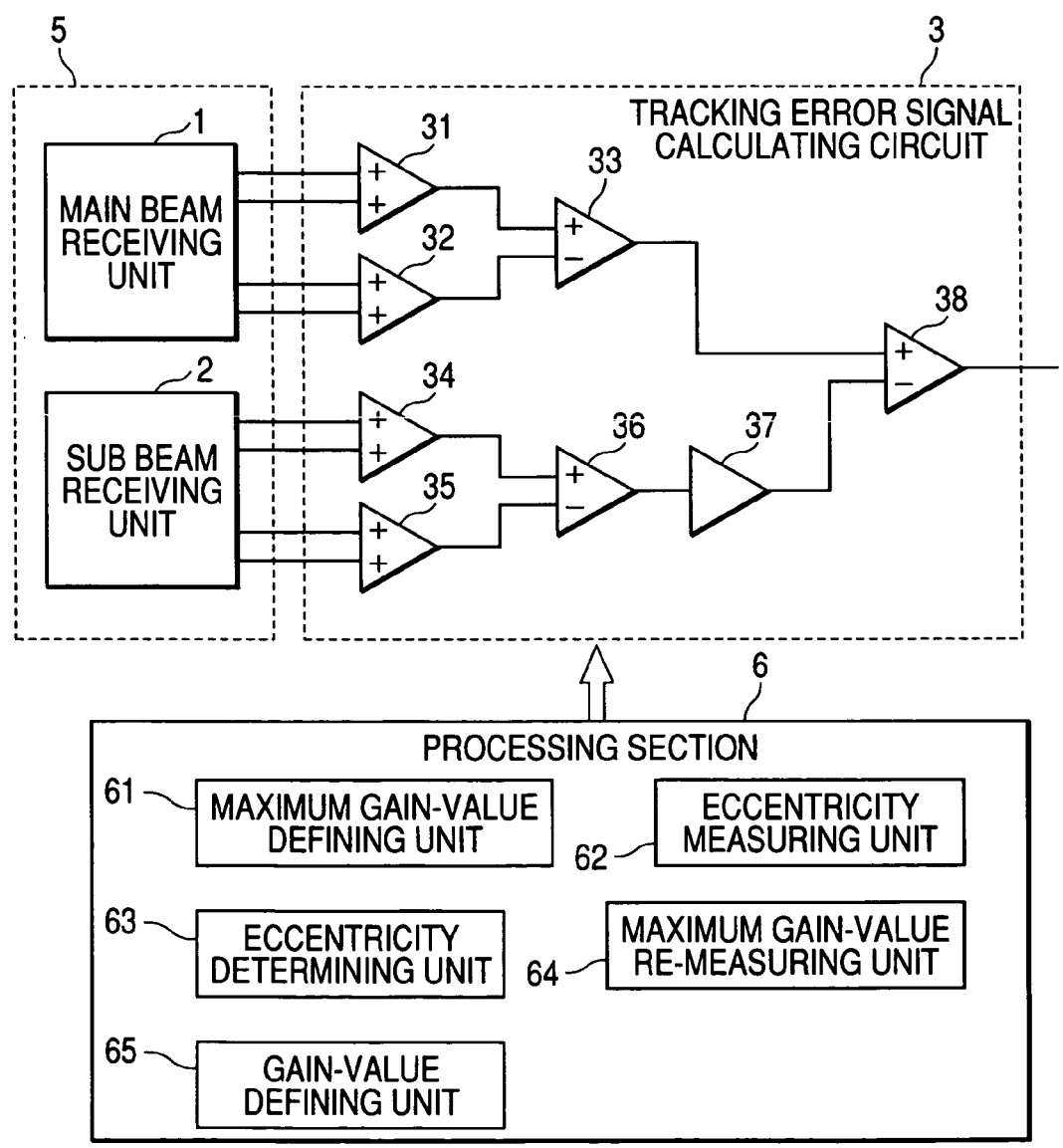
FIG. 4 is a block diagram showing configurations of a tracking error signal calculating circuit and a processing section in an optical disk recording/reproducing apparatus according to a second embodiment of the present invention.

FIG. 4 is a block diagram showing configurations of a tracking error signal calculating circuit and a processing section in an optical disk recording/reproducing apparatus according to a second embodiment of the present invention. In FIG. 4, the same components as those of FIG. 1 are indicated by the same reference numerals, and the detailed description thereof is omitted.

In FIG. 4, the processing section 6 includes maximum gain-value defining unit 61 for measuring the gain value k corresponding to a level ratio between the main push-pull signal (MPP signal) and the sub push-pull signal (SPP signal) to define an maximum value of the gain value k, eccentricity measuring unit 62 for measuring an eccentricity of the optical disk based on the sub push-pull signal (SPP signal), eccentricity determining unit 63 for determining whether or not the measured eccentricity is greater than or equal to a predetermined value, maximum gain-value re-measuring unit 64 for defining one of preceding and following beam signals of the reflected sub beam as the sub push-pull signal (SPP signal) and re-measuring the maximum value of the gain value k to define the maximum value as the gain value k of the amplifier 37 if the eccentricity is determined to be greater than or equal to the predetermined value, and gain-value defining unit 65 for selecting the maximum value of the gain value k to define the maximum value as the gain value k of the amplifier 37 if the eccentricity is determined to be less than the predetermined value.

Figure 5:
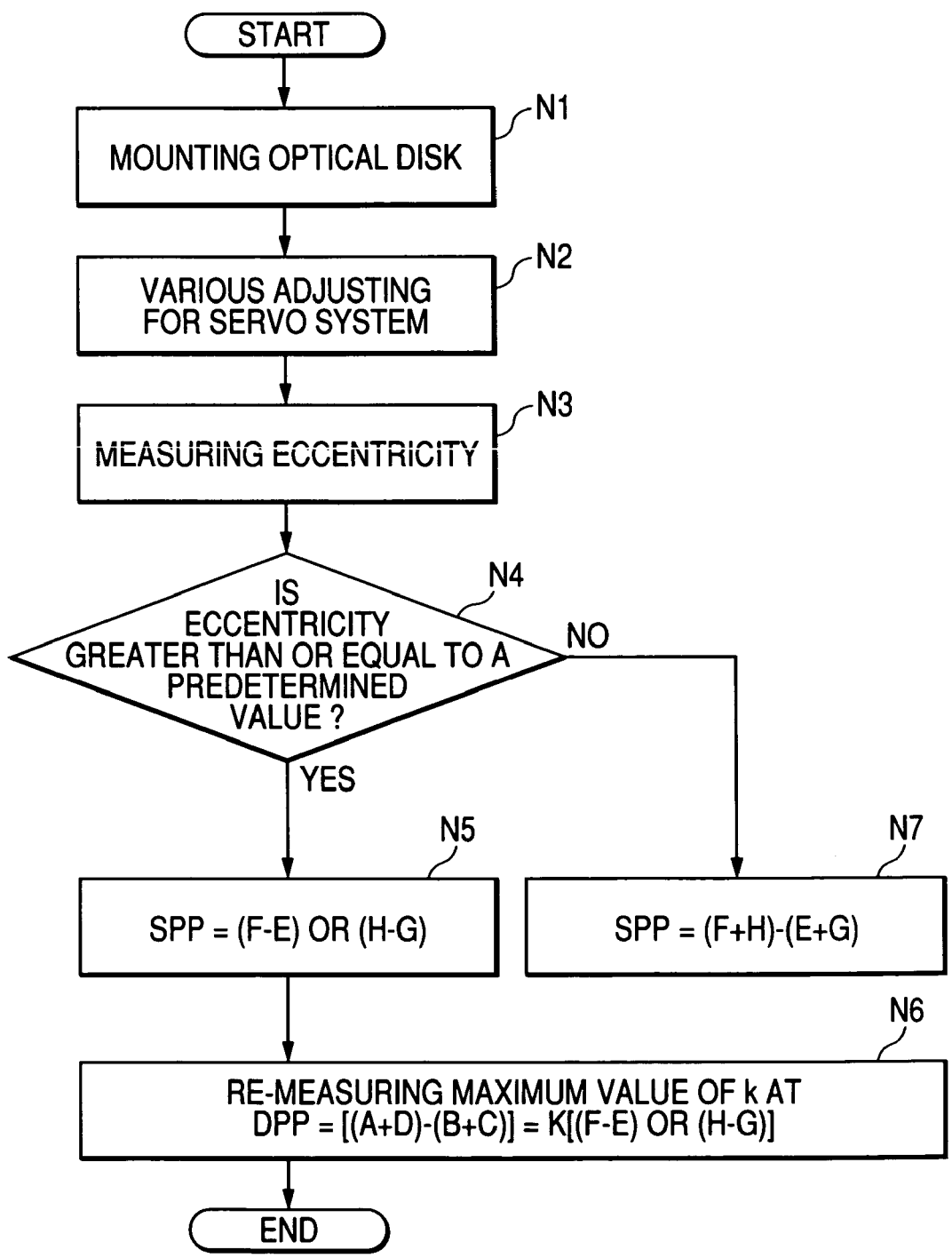
FIG. 5 is a flowchart for explaining a process for correcting a gain value in the second embodiment.

FIG. 5 is a flowchart for explaining a process for correcting a gain value k in the second embodiment. The process for correcting the gain value k will be described with reference to the flowchart.

In this process, in consideration of the eccentricity of the optical disk, a signal used to generate a sub push-pull signal (SPP signal) is changed. The variation in amplitude of the sub push-pull signal (SPP signal) is caused by the variation in the phase difference between the signals E, F, G, and H due to the RD-shifted or eccentric disk, and affected by the phase difference between the signals F and H or between the signals E and G. In addition, since the variations between the phase differences of the signals F and E and the signals H and G are equal to each other, there is no variation in the phase difference among the signals.

In terms of servo, since the purpose of the sub push-pull signal (SPP signal) is to cancel the offset generated at the main push-pull signal (MPP signal), the two preceding and following sub beams are not necessarily used. Although offsets occur in the preceding and following beams, it can be corrected by using the gain value k. In other words, even though a signal-level difference occurs between the preceding and following beams due to a difference between light amounts thereof, it can be corrected by the gain value k. Therefore, the deterioration in quality of the DPP•TE signal can be cancelled by using the signal (F−E) or the signal (H−G), which does not affect the RD-shifted or eccentric disk, as the SPP signal.

Firstly, the optical disk is mounted on the optical disk recording/reproducing apparatus (Step N1), and while the optical disk rotates, various adjustments such as tracking servo and focusing servo are performed on the servo system (Step N2). In the Step N2, the maximum gain-value defining unit 61 of the processing section 6 measures the gain value k corresponding to a level ratio between the main push-pull signal (MPP signal) and the sub push-pull signal (SPP signal), which are generated by the tracking error signal calculating circuit 3, to define an maximum value of the gain value k. Here, the SPP signal used to measure the maximum value of the gain value k is SPP=(F+H)−(E+G).

Next, the eccentricity measuring unit 62 measures the eccentricity of the optical disk based on the sub push-pull signal (SPP signal) (Step N3). Here, the eccentricity for one rotation of the optical disk is measured. If the eccentricity is determined to be greater than or equal to the predetermined value by the eccentricity determining unit 63 (Step N4), the maximum gain-value re-measuring unit 64 defines one of preceding and following beam signals of the reflected sub beam as the sub push-pull signal (SPP signal) (Step N5) and re-measures the maximum value of the gain value k (Step N6) to define the maximum value as the gain value k of the amplifier 37. If the eccentricity is determined to be less than the predetermined value (Step N4), the gain-value defining unit 65 selects the maximum value of the gain value k to define the maximum value as the gain value k of the amplifier 37. In this case, a sub push-pull signal (SPP signal) obtained by multiplying SPP=(F+H)−(E+G) with the maximum value of the gain value k is used (Step N7).

According to the second embodiment, since a signal used to generate the sub push-pull signal (SPP signal) can be changed based on the eccentricity of the optical disk, accuracy of the tracking servo can be improved by greatly suppressing the deterioration in quality of the DPP tracking error signal due to the RD-shifted or eccentric disk. Therefore, the tracking servo during the recording or reproducing operation is stabilized, so that the recording or reproducing operation can be stabilized. In particular, a high recording density for the recording operation can be obtained.

Figure 6:
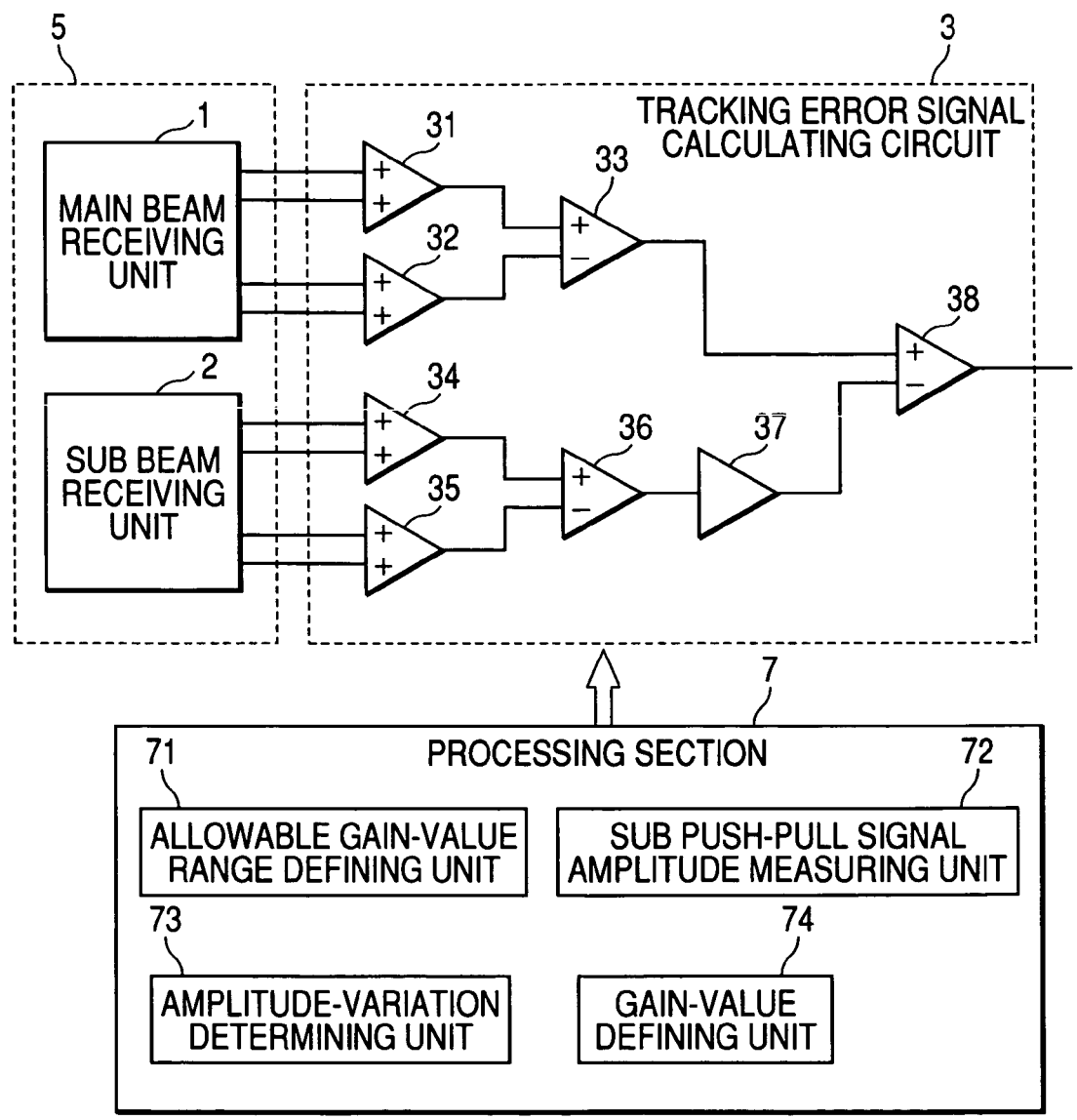
FIG. 6 is a block diagram showing configurations of a tracking error signal calculating circuit and a processing section in an optical disk recording/reproducing apparatus according to a third embodiment of the present invention.

FIG. 6 is a block diagram showing configurations of a tracking error signal calculating circuit and a processing section in an optical disk recording/reproducing apparatus according to a third embodiment of the present invention. In FIG. 6, the same components as those of FIG. 1 are indicated by the same reference numerals, and the detailed description thereof is omitted.

In FIG. 6, the processing section 7 includes allowable gain-value range defining unit 71 for measuring the gain value corresponding to a level ratio between the main push-pull signal (MPP signal) and the sub push-pull signal (SPP signal) to define an allowable range of the gain value, sub push-pull signal amplitude measuring unit 72 for measuring an amplitude of the sub push-pull signal (SPP signal), amplitude-variation determining unit 73 for determining whether or not a variation in the measured amplitude is greater than or equal to a predetermined value, and gain-value defining unit 74 for selecting a minimum value of the gain value k to define the minimum value as a gain value k of the amplifier 37 if the variation in the amplitude is determined to be greater than or equal to the predetermined value and for selecting a central value of the gain value k to define the central value as the gain value k of the amplifier 37 if the variation in the amplitude is determined to be less than the predetermined value.

Figure 7:
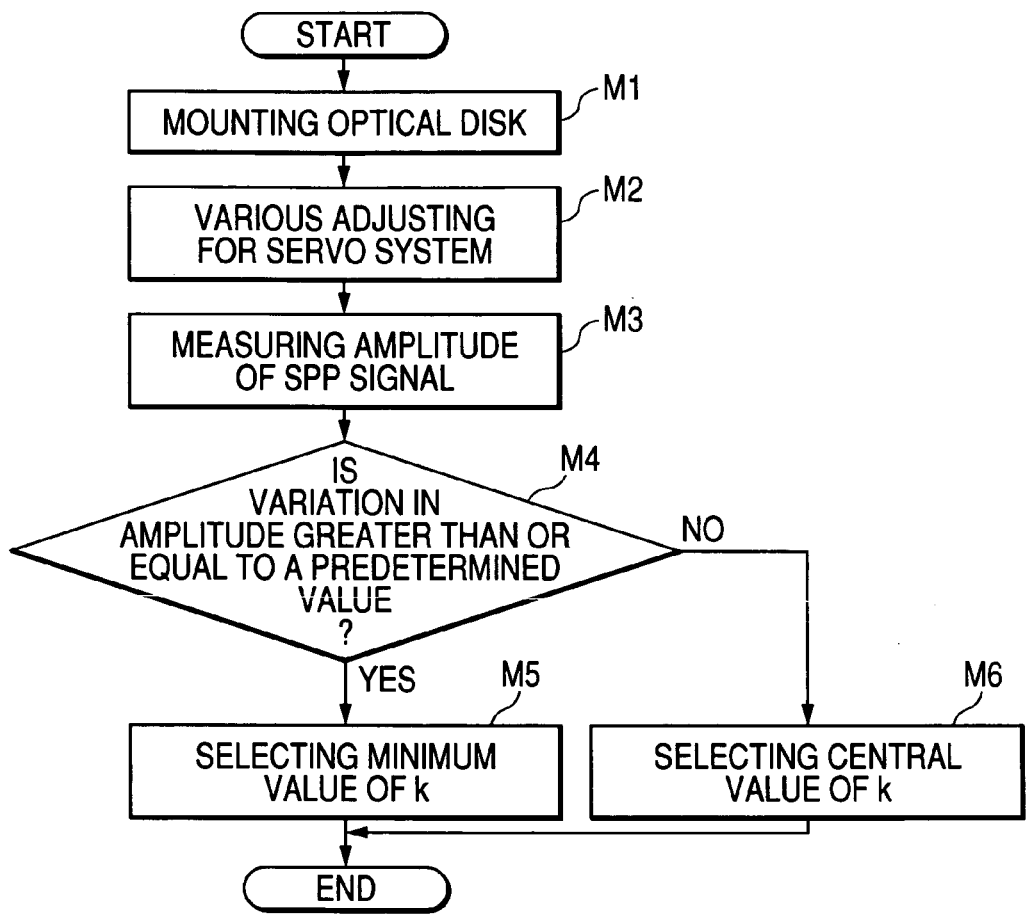
FIG. 7 is a flowchart for explaining a process for correcting a gain value in the third embodiment.

FIG. 7 is a flowchart for explaining a process for correcting a gain value k in the third embodiment. The process for correcting the gain value k will be described with reference to the flowchart.

In the process, in consideration of the variation in the amplitude of the sub push-pull signal (SPP signal), the gain value k is corrected. Although the reason for the deterioration in quality of the DPP tracking error signal (DPP•TE signal) is determined by measuring the eccentricity in consideration of the eccentricity of the optical disk in the first embodiment, the variation in the amplitude is measured in consideration of the variation in the amplitude of the SPP signal for one rotational period of the optical disk and the gain value k is obtained based on the variation in the amplitude thereof in the third embodiment.

Firstly, the optical disk is mounted on the optical disk recording/reproducing apparatus (Step M1), and while the optical disk rotates, various adjustments such as tracking servo and focusing servo are performed on the servo system (Step M2). In the Step M2, the allowable gain-value range defining unit 71 of the processing section 7 measures the gain value k corresponding to a level ratio between the main push-pull signal (MPP signal) and the sub push-pull signal (SPP signal), which are generated by the tracking error signal calculating circuit 3, to define an allowable range of the gain value k. In other words, the allowable range of the gain value k is checked, and a range of the gain value k which does not affect the servo characteristic is measured.

Next, the sub push-pull signal amplitude measuring unit 72 measures the amplitude of the sub push-pull signal (SPP signal) (Step M3). Here, the amplitude of the SPP signal for one rotation of the optical disk is measured. If the variation in the amplitude is determined to be greater than or equal to the predetermined value by the amplitude-variation determining unit 73 (Step M4), the gain-value defining unit 74 selects a minimum value of the gain value k (Step M5) to define the minimum value as a gain value k of the amplifier 37. If the variation in the amplitude is determined to be less than the predetermined value (Step M4), the gain-value defining unit 74 selects a central value of the gain value k (Step M6) to define the central value as a gain value k of the amplifier 37.

Figure 8:
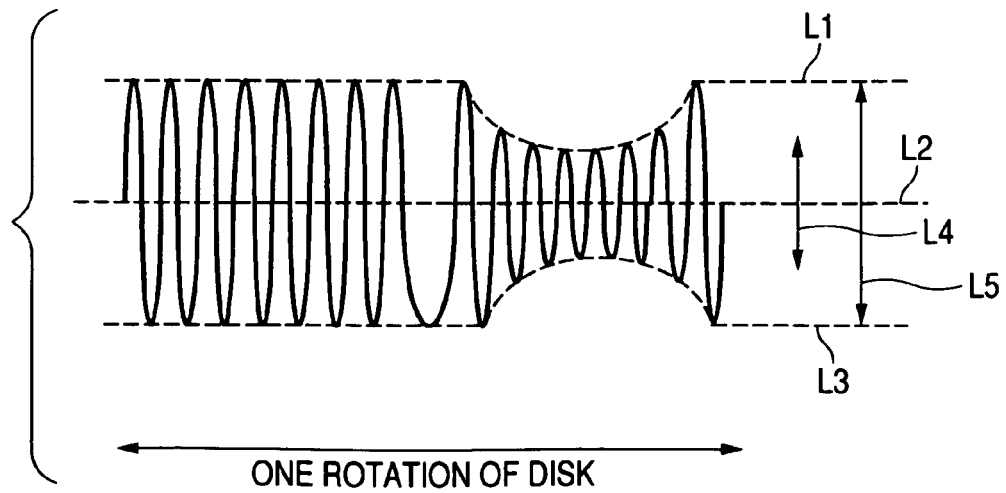
FIG. 8 is a signal waveform view showing a variation in amplitude of an SPP signal for one rotation of an optical disk.

FIG. 8 is a signal waveform view showing a variation in amplitude of an SPP signal for one rotation of an optical disk. In FIG. 8, L1 is a line indicating peak values of the DPP tracking error signal (DPP•TE signal), L2 is a line indicating a reference voltage, and L3 is a line indicating bottom values of the DPP tracking error signal (DPP•TE signal). In addition, L4 and L5 denote level differences used to determine the variation in the amplitude of the SPP signal. The TE peak values (line L1), the TE bottom values (line L3), and the reference voltage (line L2) are input to the processing section 7 implemented by a microcomputer or the like via A/D converting circuit (not shown), levels for one rotation of the disk is monitored, and change of the levels is calculated, so that variation in the amplitude of the SPP signal can be obtained.

According to the third embodiment, since the gain value k can be corrected based on the variation in the amplitude of the sub push-pull signal (SPP signal), accuracy of the tracking servo can be improved by greatly suppressing the deterioration in quality of the DPP tracking error signal due to the RD-shifted or eccentric disk. Therefore, the tracking servo during the recording or reproducing operation is stabilized, so that the recording or reproducing operation can be stabilized. In particular, a high recording density for the recording operation can be obtained.

Figure 9:
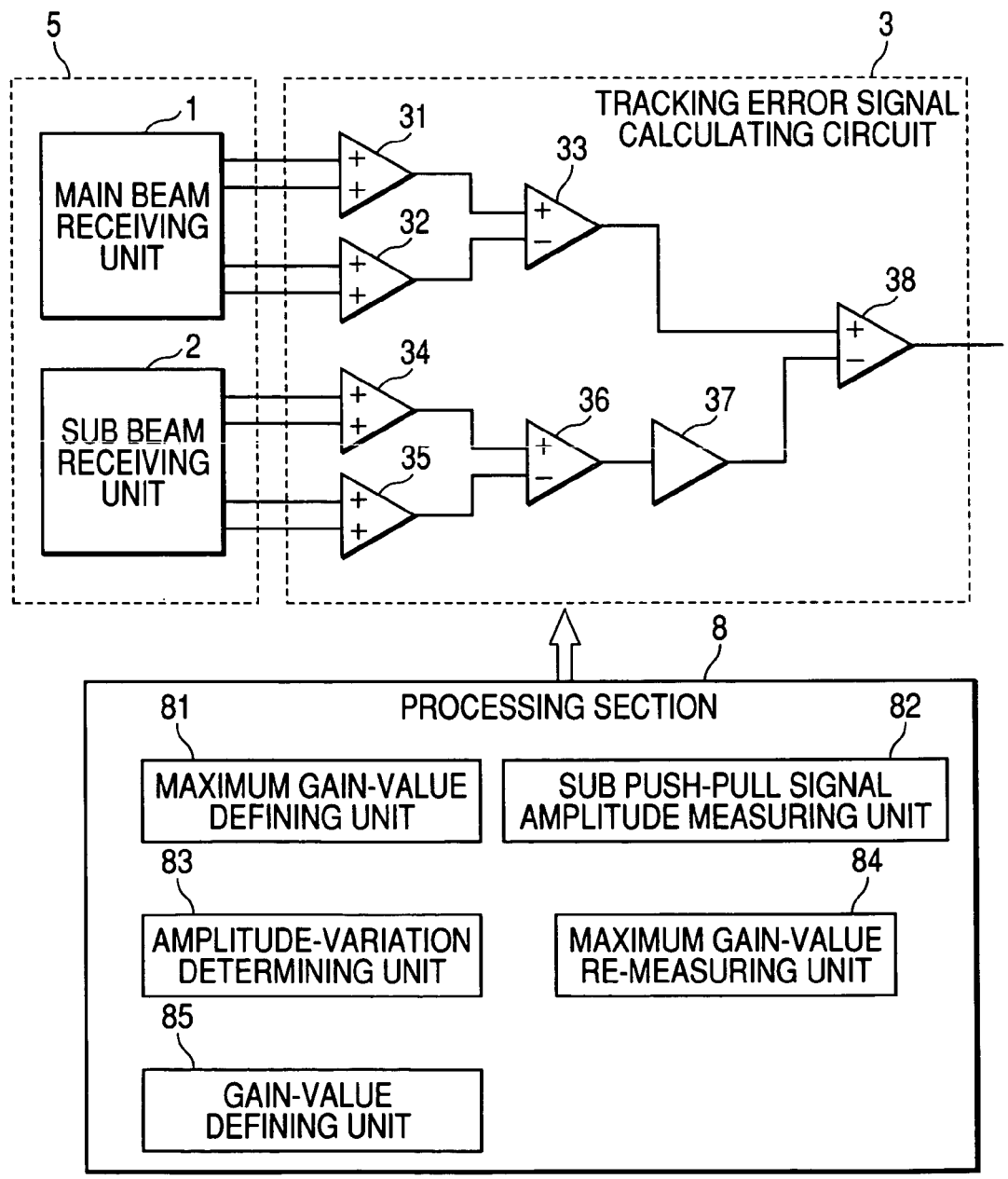
FIG. 9 is a block diagram showing configurations of a tracking error signal calculating circuit and a processing section in an optical disk recording/reproducing apparatus according to a fourth embodiment of the present invention.

FIG. 9 is a block diagram showing configurations of a tracking error signal calculating circuit and a processing section in an optical disk recording/reproducing apparatus according to a fourth embodiment of the present invention. In FIG. 9, the same components as those of FIG. 1 are indicated by the same reference numerals, and the detailed description thereof is omitted.

In FIG. 9, the processing section 8 includes maximum gain-value defining unit 81 for measuring the gain value k corresponding to a level ratio between the main push-pull signal (MPP signal) and the sub push-pull signal (SPP signal) to define an maximum value of the gain value k, sub push-pull signal amplitude measuring unit 82 for measuring an amplitude of the sub push-pull signal (SPP signal), amplitude-variation determining unit 83 for determining whether or not the variation in the measured amplitude is greater than or equal to a predetermined value, maximum gain-value re-measuring unit 84 for defining one of preceding and following beam signals of the reflected sub beam as the sub push-pull signal (SPP signal) and re-measuring the maximum value of the gain value k to define the maximum value as the gain value k of the amplifier 37 if the variation in the amplitude is determined to be greater than or equal to the predetermined value, and gain-value defining unit 85 for selecting the maximum value of the gain value k to define the maximum value as the gain value k of the amplifier 37 if the variation in the amplitude is determined to be less than the predetermined value.

Figure 10:
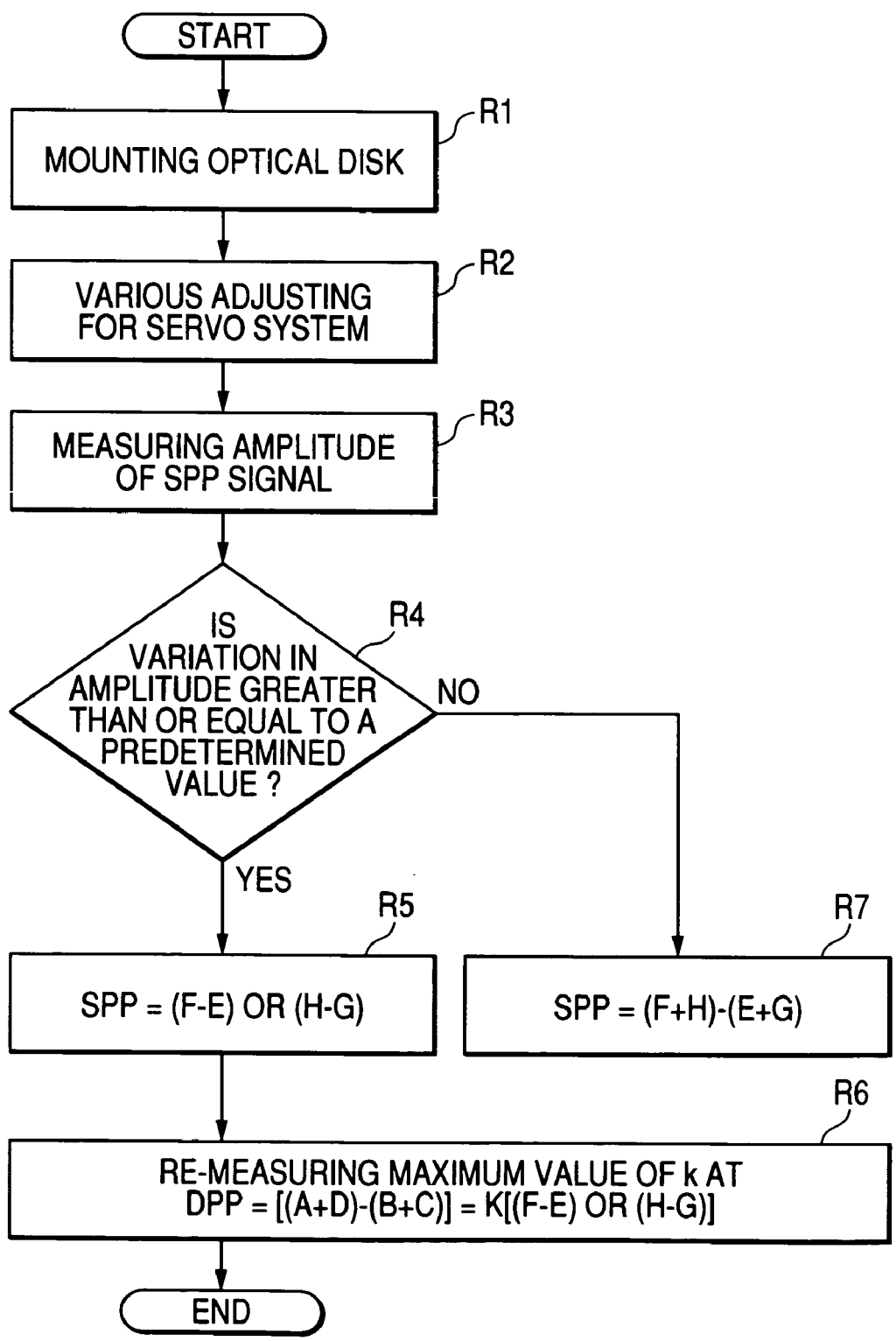
FIG. 10 is a flowchart for explaining a process for correcting a gain value in the fourth embodiment.

FIG. 10 is a flowchart for explaining a process for correcting a gain value k in the fourth embodiment. The process for correcting the gain value k will be described with reference to the flowchart.

In the process, in consideration of the variation in the amplitude of the sub push-pull signal (SPP signal), a signal used to generate the sub push-pull signal (SPP signal) is changed. Although the reason for the deterioration in quality of the DPP tracking error signal (DPP•TE signal) is determined by measuring the eccentricity in consideration of the eccentricity of the optical disk in the second embodiment, the variation in the amplitude is measured in consideration of the variation in the amplitude of the SPP signal for one rotational period of the optical disk and the SPP signal is determined based on the variation in the amplitude thereof in the fourth embodiment.

Firstly, the optical disk is mounted on the optical disk recording/reproducing apparatus (Step R1), and while the optical disk rotates, various adjustments such as tracking servo and focusing servo are performed on the servo system (Step R2). In the Step R2, the maximum gain-value defining unit 81 of the processing section 8 measures the gain value k corresponding to a level ratio between the main push-pull signal (MPP signal) and the sub push-pull signal (SPP signal), which are generated by the tracking error signal calculating circuit 3, to define an maximum value of the gain value k. Here, the SPP signal used to measure the maximum value of the gain value k is SPP=(F+H)−(E+G).

Next, the sub push-pull signal amplitude measuring unit 82 measures the amplitude of the sub push-pull signal (SPP signal) (Step R3). Here, the amplitude of the SPP signal for one rotation of the optical disk is measured. If the variation in the amplitude is determined to be greater than or equal to the predetermined value by the amplitude-variation determining unit 83 (Step R4), the maximum gain-value re-measuring unit 84 defines one of preceding and following beam signals of the reflected sub beam as the sub push-pull signal (SPP signal) (Step R5) and re-measures the maximum value of the gain value k (Step R6) to define the maximum value as a gain value k of the amplifier 37. On the other hand, if the variation in the amplitude is determined to be less than the predetermined value (Step R4), the gain-value defining unit 84 selects the maximum value of the gain value k to define the maximum value as the gain value k of the amplifier 37. In this case, a sub push-pull signal (SPP signal) obtained by multiplying SPP= (F+H)−(E+G) with the maximum value of the gain value k is used (Step R7).

According to the fourth embodiment, since a signal used to generate the sub push-pull signal (SPP signal) can be changed based on the variation in the amplitude of the sub push-pull signal (SPP signal), accuracy of the tracking servo can be improved by greatly suppressing the deterioration in quality of the DPP tracking error signal due to the RD-shifted or eccentric disk. Therefore, the tracking servo during the recording or reproducing operation is stabilized, so that the recording or reproducing operation can be stabilized. In particular, a high recording density for the recording operation can be obtained.

Figure 11A:
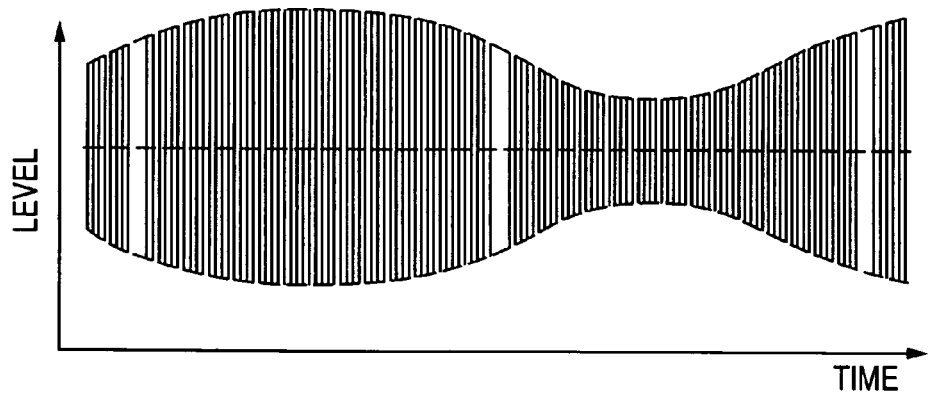
Figure 11B:
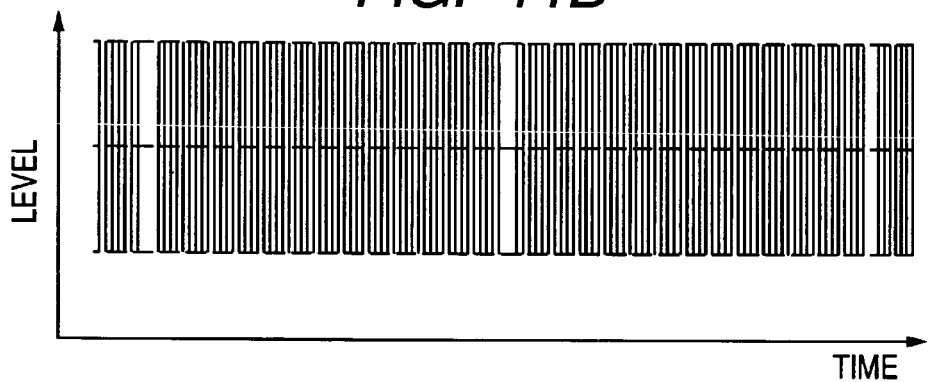
Figure 11C:
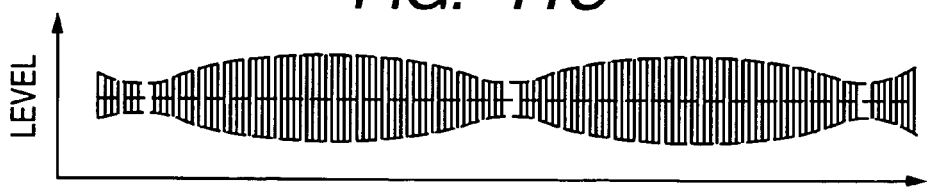
Figure 11D:
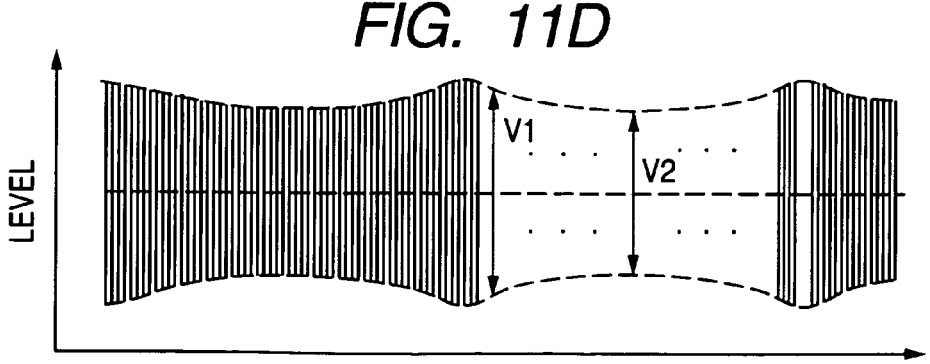

FIGS. 11A-11D are signal waveform views schematically showing signal waveforms obtained by measuring the DPP tracking error signal, and so on. FIG. 11A shows a waveform of the DPP tracking error signal (DPP•TE signal) of a disk having an eccentricity of 150 μm in a case where a phase difference of the sub beams is 160°. FIG. 11B shows a waveform of the main push-pull signal (MPP signal) of a disk having an eccentricity of 150 μm in a case where a phase difference of the sub beams is 160°, similarly. FIG. 11C shows a waveform of the sub push-pull signal (SPP signal) of a disk having an eccentricity of 150 μm in a case where a phase difference of the sub beams is 160°, similarly. FIG. 11D shows a waveform of the DPP tracking error signal (DPP•TE signal) of a disk having an eccentricity of 150 μm in a case where a phase difference of the sub beams is 0°.

As seen in the signal waveform views, the deterioration in the amplitude of the DPP tracking error signal (DPP•TE signal) for a half of the rotational period of the optical disk shown in FIG. 11A is caused by occurrence of undulation of the sub push-pull signal (SPP signal) shown in FIG. 11C. The undulation of the sub push-pull signal (SPP signal) is caused by the phase difference of the sub push-pull signal (SPP signal) due to the RD-shifted or eccentric disk. Therefore, by means of calculation by adjusting the gain value k or calculation by using the signal (F−E) or (H−G) of the sub push-pull signals (SPP signal) as shown in the aforementioned expression (1), the DPP tracking error signal (DPP•TE signal) can be approximate to the waveform shown in FIG. 11D.

In FIG. 11D, if the amplitude voltages of the DPP tracking error signal (DPP•TE signal) are indicated by V1 and V2 (V1>V2), a contraction ratio indicating the deterioration in quality of a signal can be defined as follows. Contraction Ratio=[100−(V2/V1)*100].

As from above expression, the contraction ratio is a value that indicates a variation of amplitude caused by a phase displacement.

Figure 12:
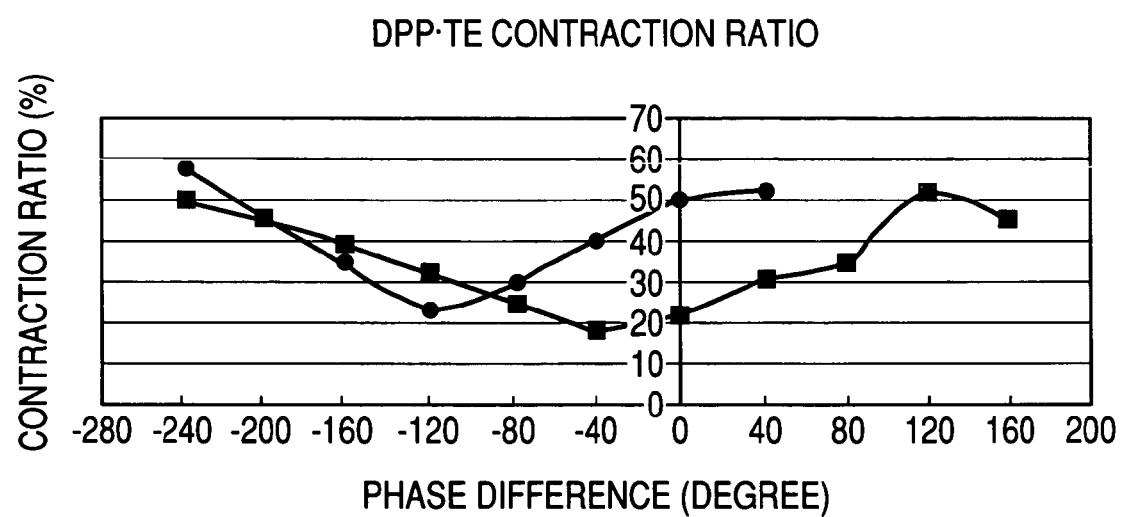
FIG. 12 is a graph showing contraction ratios of DPP tracking error signals (DPP•TE signal).

FIG. 12 is a graph showing the contraction ratios of DPP tracking error signals (DPP•TE signal). In FIG. 12, line a shows the contraction ratio of the DPP tracking error signal (DPP•TE signal) obtained according to the aforementioned embodiments, and line b shows the contraction ratio of the DPP tracking error signal (DPP•TE signal) obtained according to a conventional technique. In addition, the graph is exemplified as a reference.

According to the above-described first embodiment, since the gain value corresponding to the level ratio between the main push-pull signal and the sub push-pull signal, which are used to generate the differential-push-pull-scheme tracking error signal can be corrected based on the eccentricity of the optical disk, accuracy of the tracking servo can be improved by greatly suppressing the deterioration in quality of the DPP tracking error signal due to the RD-shifted or eccentric disk. Therefore, the tracking servo during the recording or reproducing operation can be stabilized, so that the recording or reproducing operation can be stabilized. In particular, a high recording density for the recording operation can be obtained.

According to the second embodiment, since the signal used to generate the sub push-pull signal can be changed based on the eccentricity of the optical disk, accuracy of the tracking servo can be improved by greatly suppressing the deterioration in quality of the DPP tracking error signal due to the RD-shifted or eccentric disk. Therefore, the tracking servo during the recording or reproducing operation can be stabilized, so that the recording or reproducing operation can be stabilized. In particular, a high recording density for the recording operation can be obtained.

According to the third embodiment, since the gain value can be corrected based on the variation in the amplitude of the sub push-pull signal, accuracy of the tracking servo can be improved by greatly suppressing the deterioration in quality of the DPP tracking error signal due to the RD-shifted or eccentric disk. Therefore, the tracking servo during the recording or reproducing operation can be stabilized, so that the recording or reproducing operation can be stabilized. In particular, a high recording density for the recording operation can be obtained.

According to the fourth embodiment, since the signal used to generate the sub push-pull signal can be changed based on the variation in the amplitude of the sub push-pull signal, accuracy of the tracking servo can be improved by greatly suppressing the deterioration in quality of the DPP tracking error signal due to the RD-shifted or eccentric disk. Therefore, the tracking servo during the recording or reproducing operation can be stabilized, so that the recording or reproducing operation can be stabilized. In particular, a high recording density for the recording operation can be obtained.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical disk recording/reproducing apparatus comprising:
   (1) an optical pickup that emits a laser beam containing main and sub beams onto an optical disk, the optical pickup including:
      main beam receiving means for receiving the main beam reflected from a target track of the optical disk; and
      sub beam receiving means for receiving the sub beam reflected from a position deviated from the target track;
   (2) a tracking error signal calculating circuit including:
      main push-pull signal generating means for generating a main push-pull signal which is a main servo error signal based on the main beam signal output from the main beam receiving means;

sub push-pull signal generating means for generating a sub push-pull signal which is a sub servo error signal based on the sub beam signal output from the sub beam receiving means;

amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including:

allowable gain-value range defining means for measuring the gain value corresponding to a level ratio between the main push-pull signal and the sub push-pull signal to define an allowable range of the gain value;

eccentricity measuring means for measuring an eccentricity of the optical disk based on the sub push-pull signal;

eccentricity determining means for determining whether or not the measured eccentricity is greater than or equal to a predetermined value; and gain-value defining means for defining a minimum value as a gain value of the amplifying means by selecting the minimum value of the gain value if the eccentricity is determined to be greater than or equal to the predetermined value and for defining a central value as a gain value of the amplifying means by selecting the central value of the gain value if the eccentricity is determined to be less than the predetermined value.

2. An optical disk recording/reproducing apparatus comprising:

(1) an optical pickup that emits a laser beam containing main and sub beams onto an optical disk, the optical pickup including:

main beam receiving means for receiving the main beam reflected from a target track of the optical disk; and sub beam receiving means for receiving the sub beam reflected from a position deviated from the target track;

(2) a tracking error signal calculating circuit including:

main push-pull signal generating means for generating a main push-pull signal which is a main servo error signal based on the main beam signal output from the main beam receiving means;

sub push-pull signal generating means for generating a sub push-pull signal which is a sub servo error signal based on the sub beam signal output from the sub beam receiving means;

amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including:

maximum gain-value defining means for measuring the gain value corresponding to a level ratio between the main push-pull signal and the sub push-pull signal to define an maximum value of the gain value;

eccentricity measuring means for measuring an eccentricity of the optical disk based on the sub push-pull signal;

eccentricity determining means for determining whether or not the measured eccentricity is greater than or equal to a predetermined value;

maximum gain-value re-measuring means for defining one of preceding and following beam signals of the reflected sub beam as the sub push-pull signal and for re-measuring the maximum value of the gain value to define the maximum value as the gain value of the amplifying means if the eccentricity is determined to be greater than or equal to the predetermined value; and gain-value defining means for selecting the maximum value of the gain value to define the maximum value as the gain value of the amplifying means if the eccentricity is determined to be less than the predetermined value.

3. An optical disk recording/reproducing apparatus comprising:

(1) an optical pickup that emits a laser beam containing main and sub beams onto an optical disk, the optical pickup including:

main beam receiving means for receiving the main beam reflected from a target track of the optical disk; and sub beam receiving means for receiving the sub beam reflected from a position deviated from the target track;

(2) a tracking error signal calculating circuit including:

main push-pull signal generating means for generating a main push-pull signal which is a main servo error signal based on the main beam signal output from the main beam receiving means;

sub push-pull signal generating means for generating a sub push-pull signal which is a sub servo error signal based on the sub beam signal output from the sub beam receiving means;

amplifying means for amplifying the sub push-pull signal output from the sub push-pull signal generating means based on a gain value; and tracking error signal generating means for generating a differential-push-pull-scheme tracking error signal based on the main push-pull signal output from the main push-pull signal generating means and the sub push-pull signal output from the amplifying means; and (3) a processing section including:

allowable gain-value range defining means for measuring the gain value corresponding to a level ratio between the main push-pull signal and the sub push-pull signal to define an allowable range of the gain value;

sub push-pull signal amplitude measuring means for measuring an amplitude of the sub push-pull signal;

amplitude-variation determining means for determining whether or not a variation in the measured amplitude is greater than or equal to a predetermined value; and gain-value defining means for selecting a minimum value of the gain value to define the minimum value as a gain value of the amplifying means if the variation in the measured amplitude is determined to be greater than or equal to the predetermined value and for selecting a central value of the gain value to define the central value as the gain value of the amplifying means if the variation in the measured amplitude is determined to be less than the predetermined value.

4. An optical disk recording/reproducing apparatus comprising:
  (1) an optical pickup that emits a laser beam containing main and sub beams onto an optical disk, the optical pickup including:
    main beam receiving means for receiving the main beam reflected from a target track of the optical disk; and
    sub beam receiving means for receiving the sub beam reflected from a position deviated from the target track;
  (2) a tracking error signal calculating circuit including:
    main push-pull signal generating means for generating a main push-pull signal which is a main servo error signal based on the main beam signal output from the main beam receiving means;
    sub push-pull signal generating means for generating a sub push-pull signal which is a sub servo error signal based on the sub beam signal output from the sub beam receiving means;
    amplifying means for amplifying the sub push-pull signal output from the sub push-pull signal generating means based on a gain value; and
    tracking error signal generating means for generating a differential-push-pull-scheme tracking error signal based on the main push-pull signal output from the main push-pull signal generating means and the sub push-pull signal output from the amplifying means; and
  (3) a processing section including:
    maximum gain-value defining means for measuring the gain value corresponding to a level ratio between the main push-pull signal and the sub push-pull signal to define an maximum value of the gain value;
    sub push-pull signal amplitude measuring means for measuring an amplitude of the sub push-pull signal;
    amplitude-variation determining means for determining whether or not a variation in the measured amplitude is greater than or equal to a predetermined value;
    maximum gain-value re-measuring means for defining one of preceding and following beam signals of the reflected sub beam as the sub push-pull signal and for re-measuring the maximum value of the gain value to define the maximum value as the gain value of the amplifying means if the variation in the amplitude is determined to be greater than or equal to the predetermined value; and
    gain-value defining means for selecting the maximum value of the gain value to define the maximum value as the gain value of the amplifying means if the variation in the amplitude is determined to be less than the predetermined value.

5. An optical disk recording/reproducing apparatus comprising:
  (1) an optical pickup that emits a laser beam containing main and sub beams onto an optical disk, the optical pickup including:
    a main beam receiving unit that receives the main beam reflected from a target track of the optical disk; and
    a sub beam receiving unit that receives the sub beam reflected from a position deviated from the target track;
  (2) a tracking error signal calculating circuit including:
    a main push-pull signal generating unit that generates a main push-pull signal which is a main servo error signal based on the main beam signal output from the main beam receiving unit;
    a sub push-pull signal generating unit that generates a sub push-pull signal which is a sub servo error signal based on the sub beam signal output from the sub beam receiving unit;
    an amplifying unit that amplifies the sub push-pull signal output from the sub push-pull signal generating unit based on a gain value; and
    a tracking error signal generating unit that generates a differential-push-pull-scheme tracking error signal based on the main push-pull signal output from the main push-pull signal generating unit and the sub push-pull signal output from the amplifying unit; and
  (3) a processing section including:
    an allowable gain-value range defining unit that measures the gain value corresponding to a level ratio between the main push-pull signal and the sub push-pull signal to define an allowable range of the gain value;
    an eccentricity measuring unit that measures an eccentricity of the optical disk based on the sub push-pull signal;
    an eccentricity determining unit that determines whether or not the measured eccentricity is greater than or equal to a predetermined value; and
    a gain-value defining unit that defines a minimum value as a gain value of the amplifying unit by selecting the minimum value of the gain value if the eccentricity is determined to be greater than or equal to the predetermined value and that defines a central value as a gain value of the amplifying unit by selecting the central value of the gain value if the eccentricity is determined to be less than the predetermined value.

6. An optical disk recording/reproducing apparatus comprising:
  (1) an optical pickup that emits a laser beam containing main and sub beams onto an optical disk, the optical pickup including:
    a main beam receiving unit that receives the main beam reflected from a target track of the optical disk; and
    a sub beam receiving unit that receives the sub beam reflected from a position deviated from the target track;
  (2) a tracking error signal calculating circuit including:
    a main push-pull signal generating unit that generates a main push-pull signal which is a main servo error signal based on the main beam signal output from the main beam receiving unit;
    a sub push-pull signal generating unit that generates a sub push-pull signal which is a sub servo error signal based on the sub beam signal output from the sub beam receiving unit;
    an amplifying unit that amplifies the sub push-pull signal output from the sub push-pull signal generating unit based on a gain value; and
    a tracking error signal generating unit that generates a differential-push-pull-scheme tracking error signal based on the main push-pull signal output from the main push-pull signal generating unit and the sub push-pull signal output from the amplifying unit; and
  (3) a processing section including:
    a maximum gain-value defining unit that measures the gain value corresponding to a level ratio between the main push-pull signal and the sub push-pull signal to define an maximum value of the gain value;
    an eccentricity measuring unit that measures an eccentricity of the optical disk based on the sub push-pull signal;

an eccentricity determining unit that determines whether or not the measured eccentricity is greater than or equal to a predetermined value;

a maximum gain-value re-measuring unit that defines one of preceding and following beam signals of the reflected sub beam as the sub push-pull signal and re-measures the maximum value of the gain value to define the maximum value as the gain value of the amplifying unit if the eccentricity is determined to be greater than or equal to the predetermined value; and a gain-value defining unit that selects the maximum value of the gain value to define the maximum value as the gain value of the amplifying unit if the eccentricity is determined to be less than the predetermined value.

7. An optical disk recording/reproducing apparatus comprising:

(1) an optical pickup that emits a laser beam containing main and sub beams onto an optical disk, the optical pickup including:

a main beam receiving unit that receives the main beam reflected from a target track of the optical disk; and a sub beam receiving unit that receives the sub beam reflected from a position deviated from the target track;

(2) a tracking error signal calculating circuit including:

a main push-pull signal generating unit that generates a main push-pull signal which is a main servo error signal based on the main beam signal output from the main beam receiving unit;

a sub push-pull signal generating unit that generates a sub push-pull signal which is a sub servo error signal based on the sub beam signal output from the sub beam receiving unit;

an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including:

an allowable gain-value range defining unit that measures the gain value corresponding to a level ratio between the main push-pull signal and the sub push-pull signal to define an allowable range of the gain value;

a sub push-pull signal amplitude measuring unit that measures an amplitude of the sub push-pull signal;

an amplitude-variation determining unit that determines whether or not a variation in the measured amplitude is greater than or equal to a predetermined value; and a gain-value defining unit that selects a minimum value of the gain value to define the minimum value as a gain value of the amplifying unit if the variation in the measured amplitude is determined to be greater than or equal to the predetermined value and that selects a central value of the gain value to define the central value as the gain value of the amplifying unit if the variation in the measured amplitude is determined to be less than the predetermined value.

8. An optical disk recording/reproducing apparatus comprising:

(1) an optical pickup that emits a laser beam containing main and sub beams onto an optical disk, the optical pickup including:

a main beam receiving unit that receives the main beam reflected from a target track of the optical disk; and a sub beam receiving unit that receives the sub beam reflected from a position deviated from the target track;

(2) a tracking error signal calculating circuit including:

a main push-pull signal generating unit that generates a main push-pull signal which is a main servo error signal based on the main beam signal output from the main beam receiving unit;

a sub push-pull signal generating unit that generates a sub push-pull signal which is a sub servo error signal based on the sub beam signal output from the sub beam receiving unit;

an amplifying unit that amplifies the sub push-pull signal output from the sub push-pull signal generating unit based on a gain value; and a tracking error signal generating unit that generates a differential-push-pull-scheme tracking error signal based on the main push-pull signal output from the main push-pull signal generating unit and the sub push-pull signal output from the amplifying unit; and (3) a processing section including:

a maximum gain-value defining unit that measures the gain value corresponding to a level ratio between the main push-pull signal and the sub push-pull signal to define an maximum value of the gain value;

a sub push-pull signal amplitude measuring unit that measures an amplitude of the sub push-pull signal;

an amplitude-variation determining unit that determines whether or not a variation in the measured amplitude is greater than or equal to a predetermined value;

a maximum gain-value re-measuring unit that defines one of preceding and following beam signals of the reflected sub beam as the sub push-pull signal and re-measures the maximum value of the gain value to define the maximum value as the gain value of the amplifying unit if the variation in the amplitude is determined to be greater than or equal to the predetermined value; and a gain-value defining unit that selects the maximum value of the gain value to define the maximum value as the gain value of the amplifying unit if the variation in the amplitude is determined to be less than the predetermined value.

* * * * *